May 7, 1940.  E. T. BURTON ET AL  2,199,909
NONSPARKING ELECTROMAGNETIC SIGNALING AND SWITCHING DEVICE
Filed Oct. 29, 1936
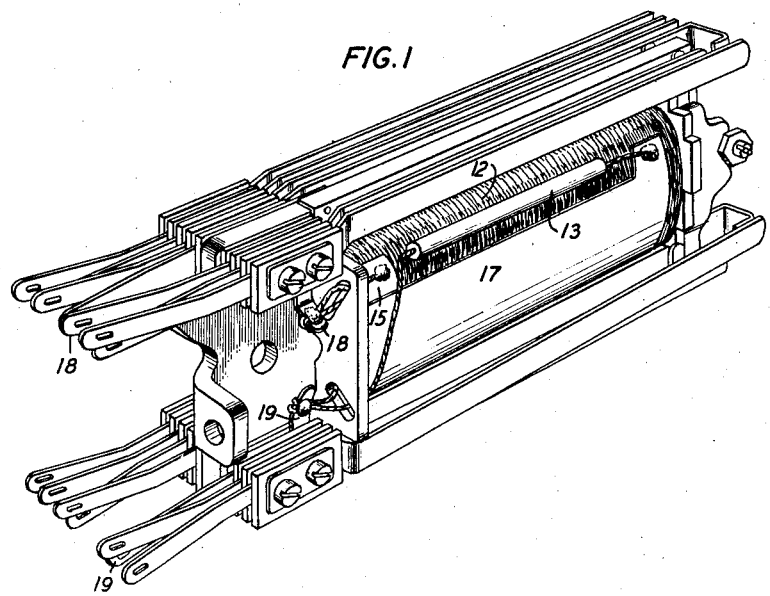
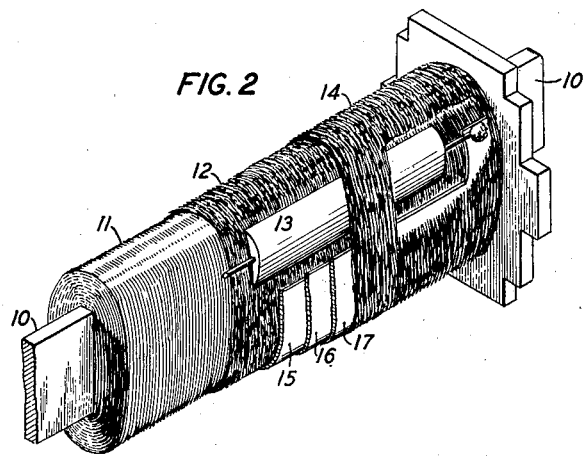
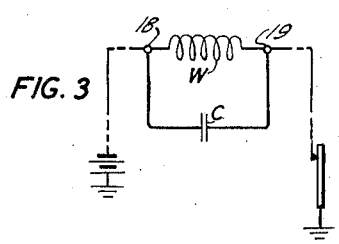
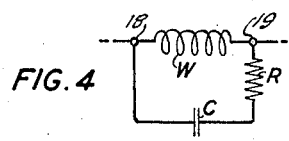
INVENTORS: E. T. BURTON
A. M. CURTIS
BY
ATTORNEY Patented May 7, 1940

2,199,909

UNITED STATES PATENT OFFICE 2,199,909

NONSPARKING ELECTROMAGNETIC SIGNALING AND SWITCHING DEVICE

Everett T. Burton, Millburn, and Austen M. Curtis, South Orange, N. J., assignors to Bell Telephone Laboratories, Incorporated, New York, N. Y., a corporation of New York Application October 29, 1936, Serial No. 108,158

3 Claims. (Cl. 175—21)

This invention relates to electromagnets and particularly to nonsparking electromagnetic devices used in signaling and switching systems.

It is the object of the invention to provide an electromagnet with means to dissipate the electrical energy stored in its winding and to incorporate this protective means with the winding in a unitary structure.

It is well known that contacts which open inductive circuits are subject to sparking and if the energy to be dissipated is large enough the contacts are injured and their useful life diminished. It is well known to connect a capacitor in parallel with circuit interrupting contacts, the capacitor being charged by the energy of magnetization upon opening of the circuit to reduce or entirely eliminate the sparking. A resistor may be connected in series with the capacitor to limit the condenser-discharge current when the contacts are next closed and modify the transient voltage at the opening. The capacitor and resistor are usually mounted close to the contacts to be protected rather than close to the inductive winding or windings which tend to cause the sparking. It has been established by theory and experiment that there will be no surge of current at a pair of contacts when breaking the current in a circuit through a winding having an inductance L and a resistance $R_1$ if the winding is shunted by a capacity $C_m$ in series with a resistance $R_m$ such that $$R_1 = R_m = \sqrt{\frac{L}{C_m}}$$

In cases where $R_1$ is the resistance of the inductive winding alone, the protective network may be connected directly across the winding.

According to this invention an electrolytic condenser is wrapped in with, and connected in parallel with, the winding of an electromagnet to dissipate the energy of magnetization upon opening of a circuit therethrough, thereby protecting the contacts at which the circuit is opened. The electrolytic condenser which is wrapped in with, and connected in parallel with, the winding of an electromagnet, not only has the desired capacity for protecting contacts at which a circuit energizing the winding is opened but also has internal resistance to limit the discharge current from the condenser upon reclosure of the circuit through the winding of the electromagnet.

A feature of the invention is the provision of a condenser wrapped in with, and connected in parallel with, the winding of an electromagnet for protecting contacts at which a circuit energizing the winding is opened; and the provision of a resistor wrapped in with the winding and condenser and connected in series with the condenser so that the resistance of the condenser and resistor together is effective to limit the discharge current from the condenser upon closure of the circuit through the winding, and to also control the shape of the transient voltage wave on opening. The additional resistor may be a cylindrical graphite rod or a piece of graphite formed to the contour of the winding of the electromagnet, or other element of high specific resistance such as a sputtered metallic film, now common in the art.

For a further and more complete explanation of this invention reference may be had to the drawing which discloses a relay arranged in accordance with the features of the invention.

Referring to the drawing:

Fig. 1 shows a relay, complete except for the outer yarn wrapping, having an electrolytic condenser and a resistor integral therewith;

Fig. 2 shows the core of the relay with part of the outer wrapping but without the armature and contact springs;

Fig. 3 shows schematically the connections between the winding and condenser when no resistor is provided; and Fig. 4 shows schematically the connections between the winding, condenser and resistor.

The relay shown in the drawing is of the type disclosed in Patent No. 1,156,671, granted to E. B. Craft, October 12, 1915, and in Patent No. 1,652,489, granted to E. D. Mead, December 13, 1927, and reference may be had to these patents for a complete description of the structure of the relay. The relay comprises a coil 11 wound around the core 10. A yarn wrapping 12 covers the coil and the ends of the coil are connected to lugs 18 and 19. An electrolytic condenser comprising an inner plate 15, electrolyte 16 and outer plate 17 conforms to the outside of the coil, the end of the inner plate 15 being connected to lug 18. A resistor 13 extends along the coil above the condenser, both the resistor and condenser being covered by an outer yarn wrapping 14. The resistor may be in the form of a cylindrical rod as shown in Fig. 1 or may be moulded to conform to the outside of the coil as shown in Fig. 2. One end of the resistor is connected to the outer plate 17 of the condenser and the other end of the resistor is connected to lug 19.

The electrolytic condenser is of the dry type such as is disclosed in Patent No. 1,966,163, granted to F. M. Clark, July 10, 1934, in Patent No. 1,918,717, granted to S. Ruben, July 18, 1933 and in Patent No. 1,986,779, granted to J. E. Lilienfeld, January 1, 1935. The plates of the condenser are of an area to provide the desired capacity and the electrolyte is of such a nature and thickness as to have the desired resistivity.

When the condenser has sufficient resistance in itself, the resistor 13 is omitted and the outer plate 17 of the condenser is connected directly to lug 19. It is only in case the resistance of the condenser is ineffective to limit the discharge current to the desired amount that the additional resistor 13 is required. The circuit condition existing when there is no additional resistor is shown schematically in Fig. 3, W being the relay winding and C being the electrolytic condenser. The circuit condition existing when an additional resistor R is required and provided is shown schematically in Fig. 4.

What is claimed is:

1. In combination, an electromagnet comprising a magnetic core and an inductive winding around said core, an inner yarn wrapping over the outside layer of said winding, an electrolytic condenser comprising inner and outer plates, said plates conforming to the curvature of said winding and wrapping, a carbon rod resistor, the inner surface of said resistor conforming to the curvature of said winding and wrapping, said condenser and resistor in series connected in parallel with said inductive winding, and an outer yarn wrapping surrounding and binding said resistor and condenser around the inner yarn wrapping.

2. In combination, an electromagnet, a resistor and a condenser, the resistor and condenser being wrapped around the winding of the electromagnet and connected in series with each other across the winding, the condenser being effective to absorb the stored energy from the winding upon the opening of an electrical circuit through the winding and the resistor being effective to limit the discharge current from said condenser.

3. In combination, an electromagnet comprising a core and an inductive winding around the core, an electrolytic condenser, the plates of said condenser being formed to wrap around said winding, a resistor comprising a rod of resistance material in the form of a longitudinal segment of a hollow cylinder, and an outer wrapping binding said condenser and said resistor around said winding to form a single piece of apparatus, said condenser and resistor being connected in series across the winding of the electromagnet, the capacity of said condenser being sufficient to absorb the energy from the winding upon the opening of a circuit through the winding and said rod having sufficient resistance in addition to the internal electrical resistance of said condenser to prevent an excessive discharge current from the condenser upon the closing of a circuit through the winding of the electromagnet while the condenser is charged.

EVERETT T. BURTON.
AUSTEN M. CURTIS.